US011867316B2

(12) United States Patent
Sasao

(10) Patent No.: US 11,867,316 B2
(45) Date of Patent: Jan. 9, 2024

(54) FLOW RATE CONTROL VALVE AND PRODUCING METHOD OF FLOW RATE CONTROL VALVE

(71) Applicant: ADVANCE DENKI KOGYO KABUSHIKI KAISHA, Kasugai (JP)

(72) Inventor: Kimihito Sasao, Kasugai (JP)

(73) Assignee: ADVANCE DENKI KOGYO KABUSHIKI KAISHA, Kasugai (JP)

( * ) Notice: Subject to any disclaimer, the term of this patent is extended or adjusted under 35 U.S.C. 154(b) by 0 days.

(21) Appl. No.: 17/886,312

(22) Filed: Aug. 11, 2022

(65) Prior Publication Data

US 2023/0062647 A1 Mar. 2, 2023

(30) Foreign Application Priority Data

Aug. 31, 2021 (JP) ................................ 2021-141128

(51) Int. Cl.
*F16K 7/17* (2006.01)
*F16K 41/10* (2006.01)
(Continued)

(52) U.S. Cl.
CPC .............. *F16K 41/103* (2013.01); *F16K 1/36* (2013.01); *F16K 7/17* (2013.01); *F16K 25/005* (2013.01); *F16K 31/1221* (2013.01)

(58) Field of Classification Search
CPC ........ F16K 41/10; F16K 41/103; F16K 41/12; F16K 7/17; F16K 25/005; F16K 31/1221; B29C 65/06; B29C 65/08; B29C 65/1412; B29C 65/1612; B29C 65/18; B29C 66/1122; B29C 66/5346; B29C 66/71;
(Continued)

(56) References Cited

U.S. PATENT DOCUMENTS

2017/0292622 A1 10/2017 Hayashi
2020/0049107 A1 2/2020 Lee

FOREIGN PATENT DOCUMENTS

JP 2019184063 A * 10/2019 ........... F16K 41/103
JP 2020-200840 A 12/2020
(Continued)

OTHER PUBLICATIONS

Office Action of corresponding Austrian Patent Application No. 50646/2022 dated Nov. 22, 2022 (29 sheets).

*Primary Examiner* — Marina A Tietjen
(74) *Attorney, Agent, or Firm* — Kratz, Quintos & Hanson, LLP

(57) ABSTRACT

[Object] The present invention provides a flaw rate control valve and a producing method of the flow rate control valve in which cross-linked PTFE having excellent abrasion resistance and capable of reducing a dust-generating amount is used only on a contact portion between a valve body and a valve seat.

[Solving Means] According to a flow rate control valve 1 of the invention, a flow path-side body 10 and a valve body 40 are made of fluorine-based resin composed of PFA or PTFE, and an annular or circular seal member 81 made of cross-linked PTFE is joined to a valve body-side abutting portion **40*a* having a valve seat 13 against which the valve body 40 abuts and to a valve seat-side abutting portion 13*a* of the valve seat 13 against which the valve body 40** abuts.

13 Claims, 14 Drawing Sheets

(51) Int. Cl.
*F16K 1/36* (2006.01)
*F16K 25/00* (2006.01)
*F16K 31/122* (2006.01)

(58) Field of Classification Search
CPC .......... B29C 66/7392; B29C 66/81267; B29C 66/8322
See application file for complete search history.

(56) References Cited

FOREIGN PATENT DOCUMENTS

| | | | | | |
|---|---|---|---|---|---|
| JP | 2022-076122 | A | | 5/2022 | |
| WO | WO-2017221877 | A1 | * | 12/2017 | ............... F16K 1/36 |

* cited by examiner

[Fig. 1]
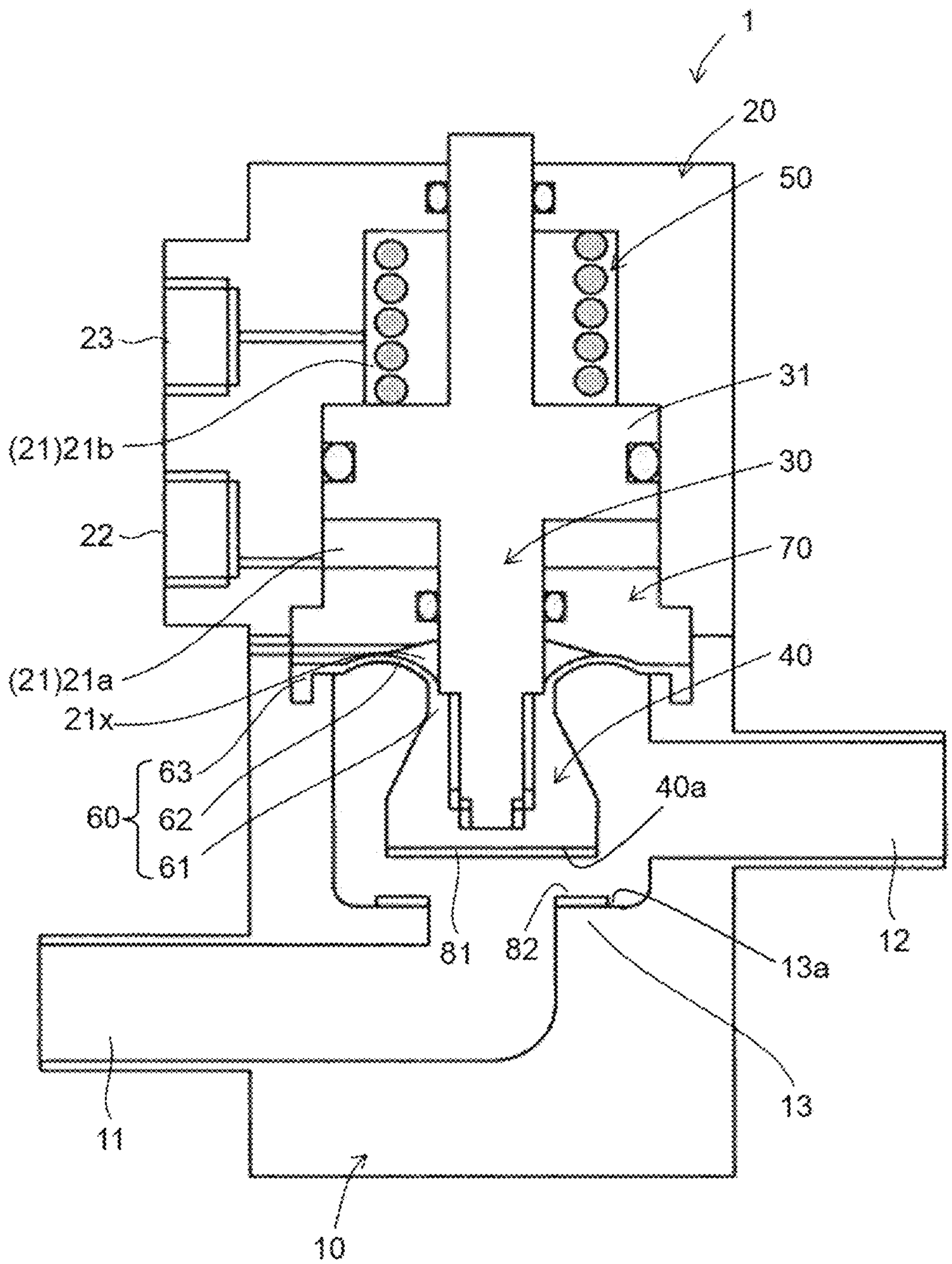

[Fig. 2]
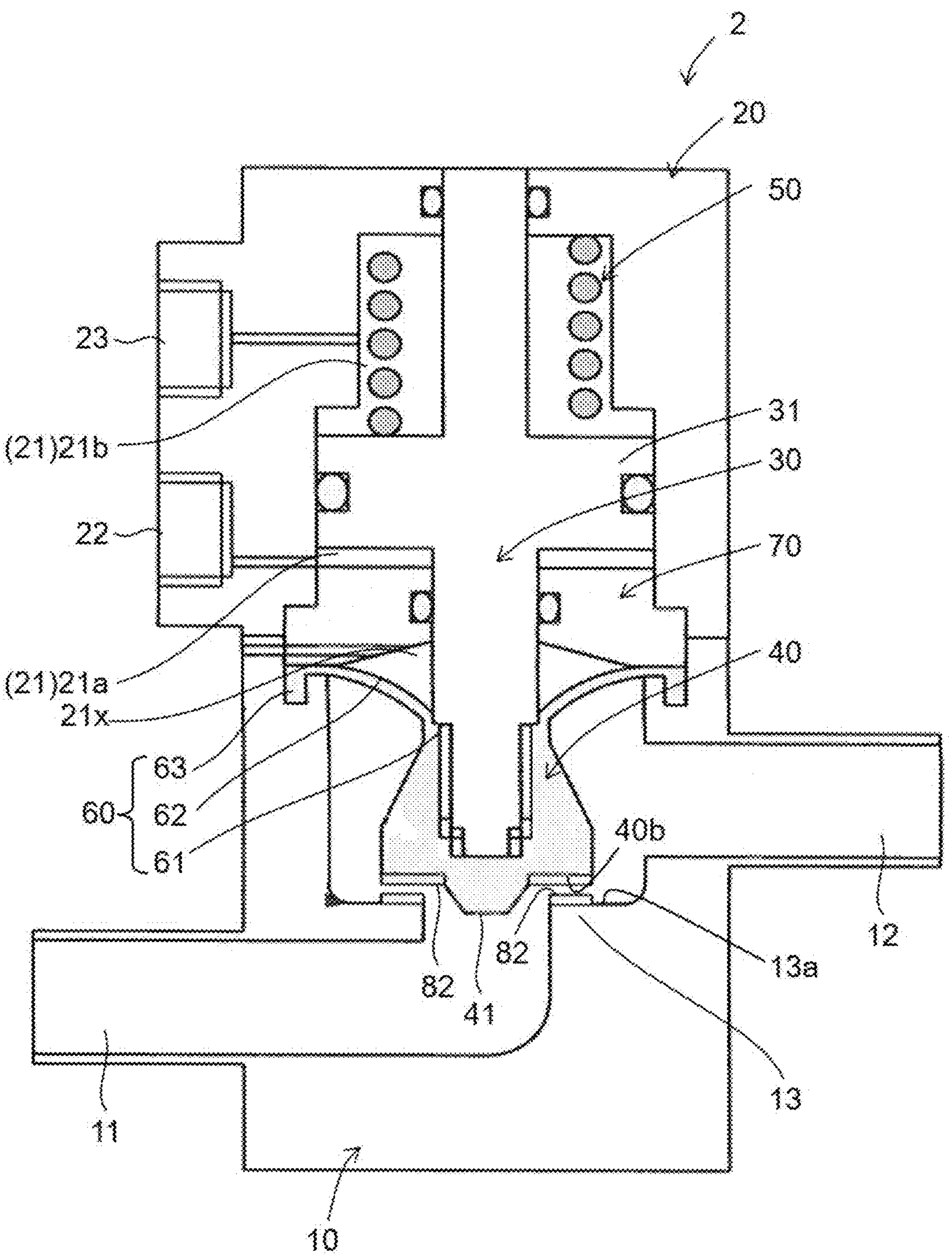

[Figs. 3]
(a)
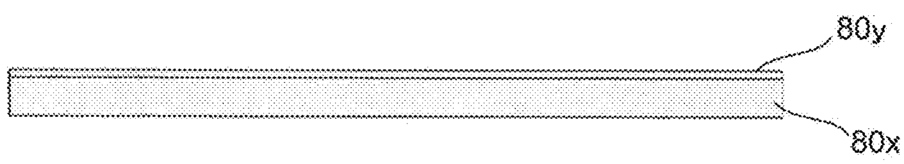
(b)
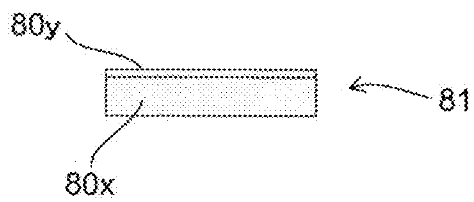

[Fig. 4]
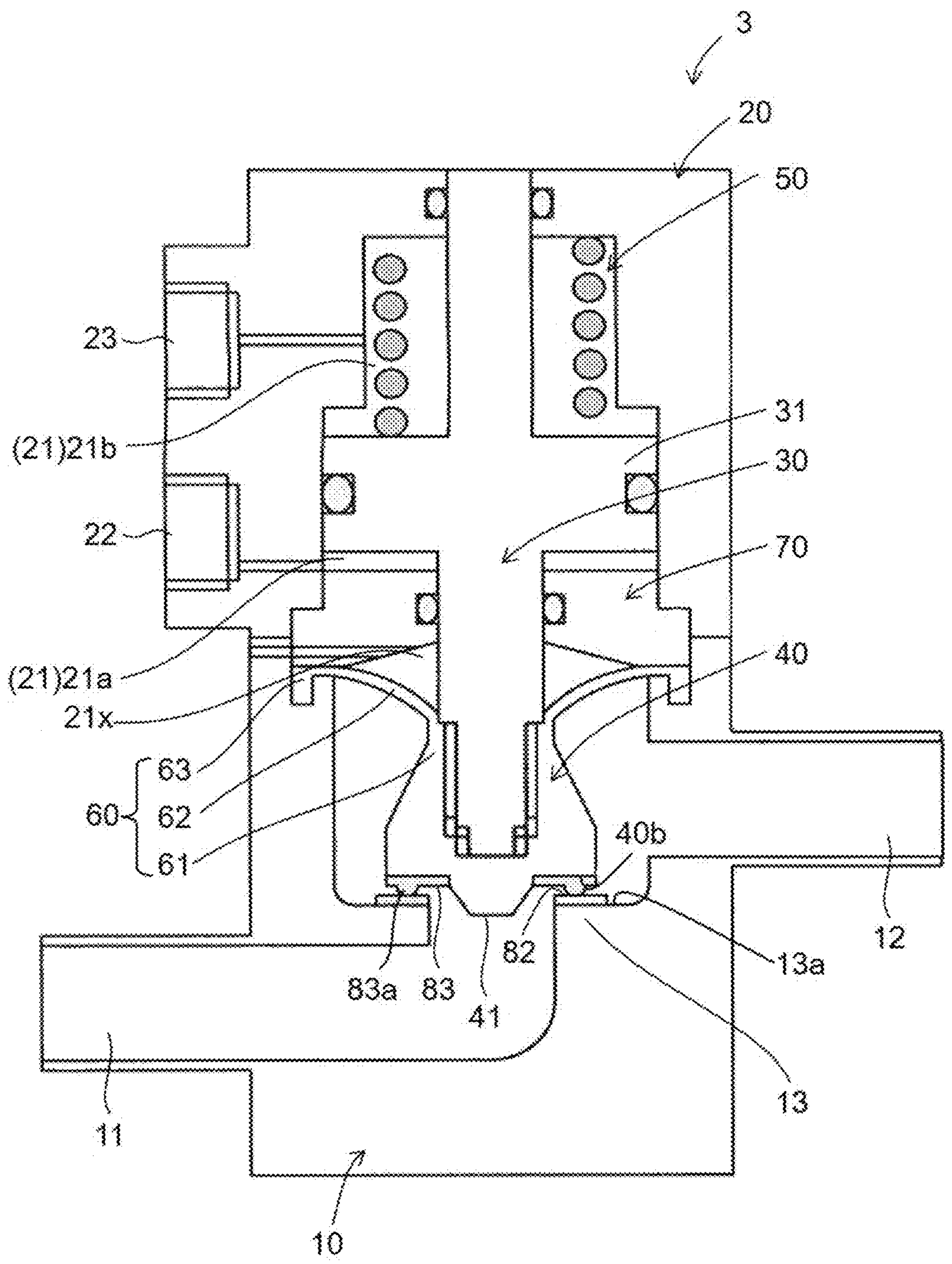

[Fig. 5]
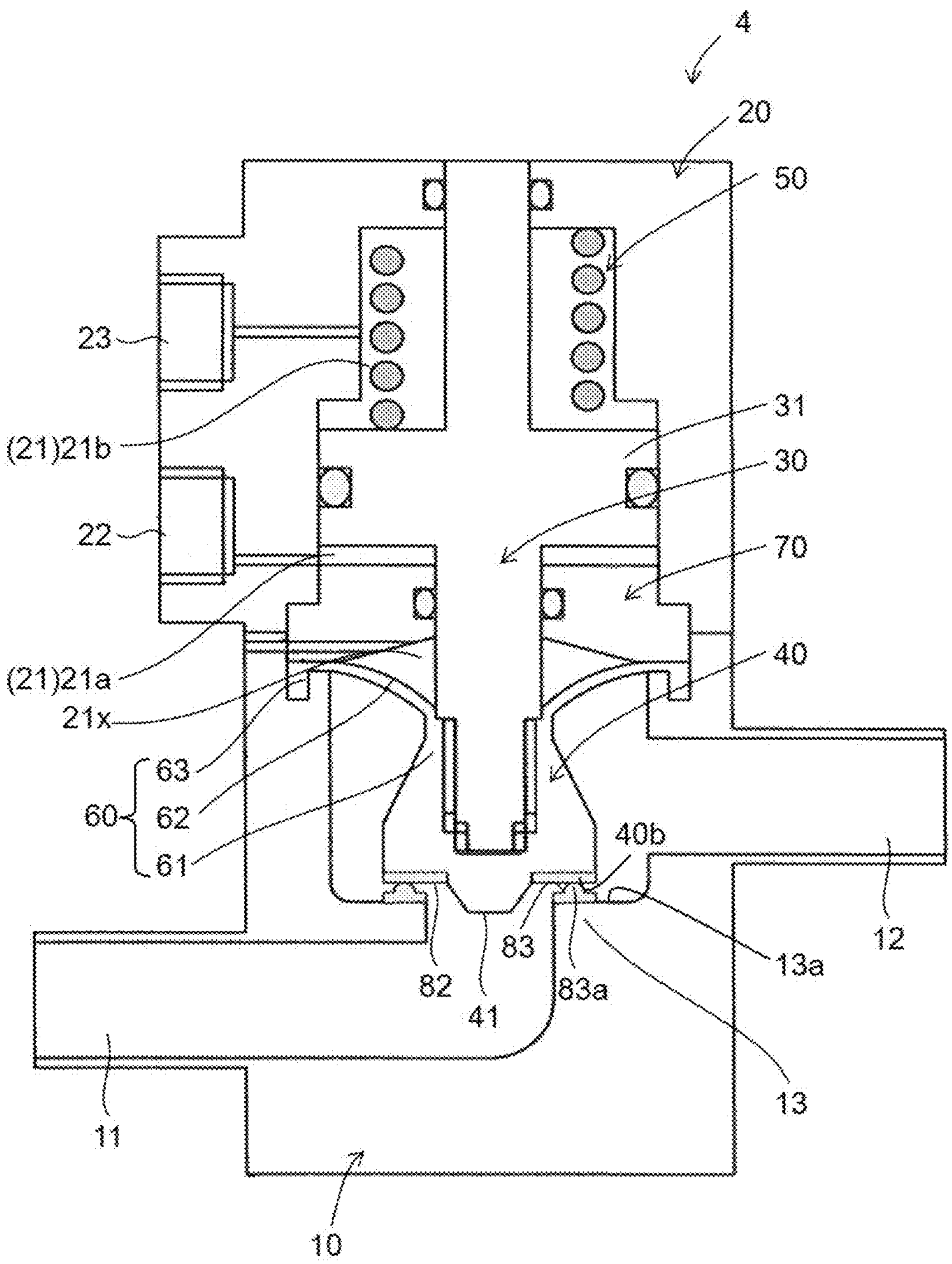

[Figs. 6]
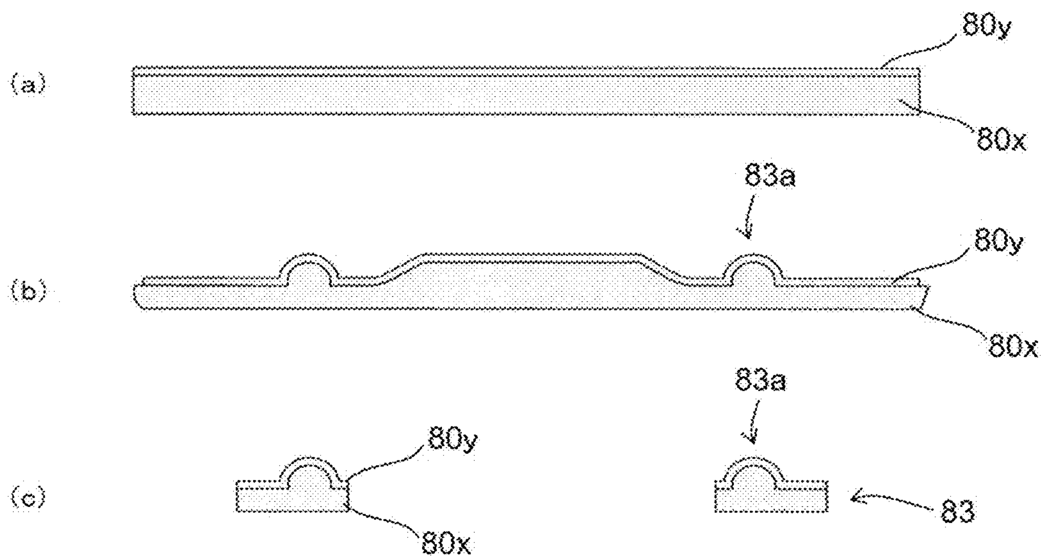

[Fig. 7]
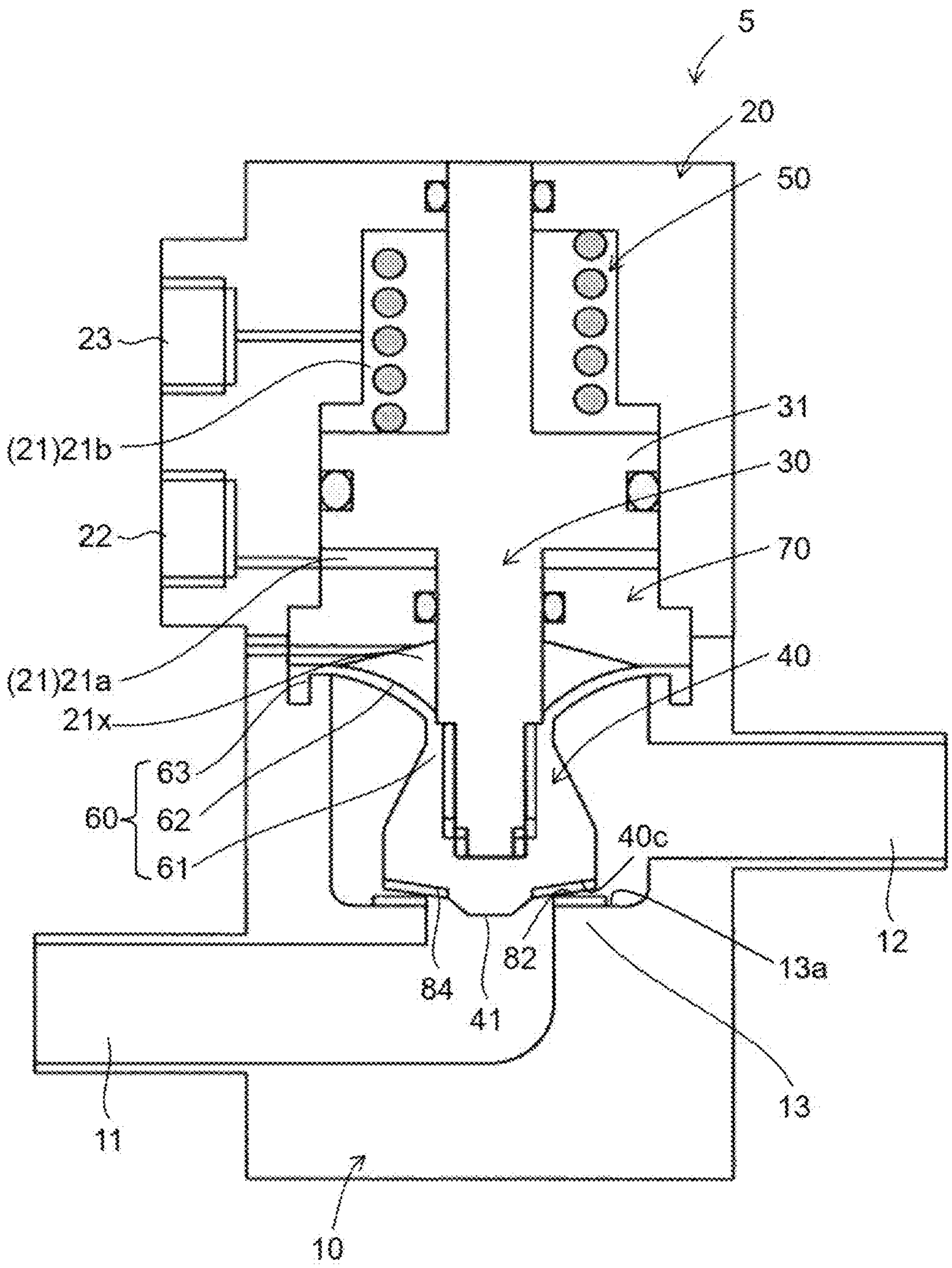

[Fig. 8]
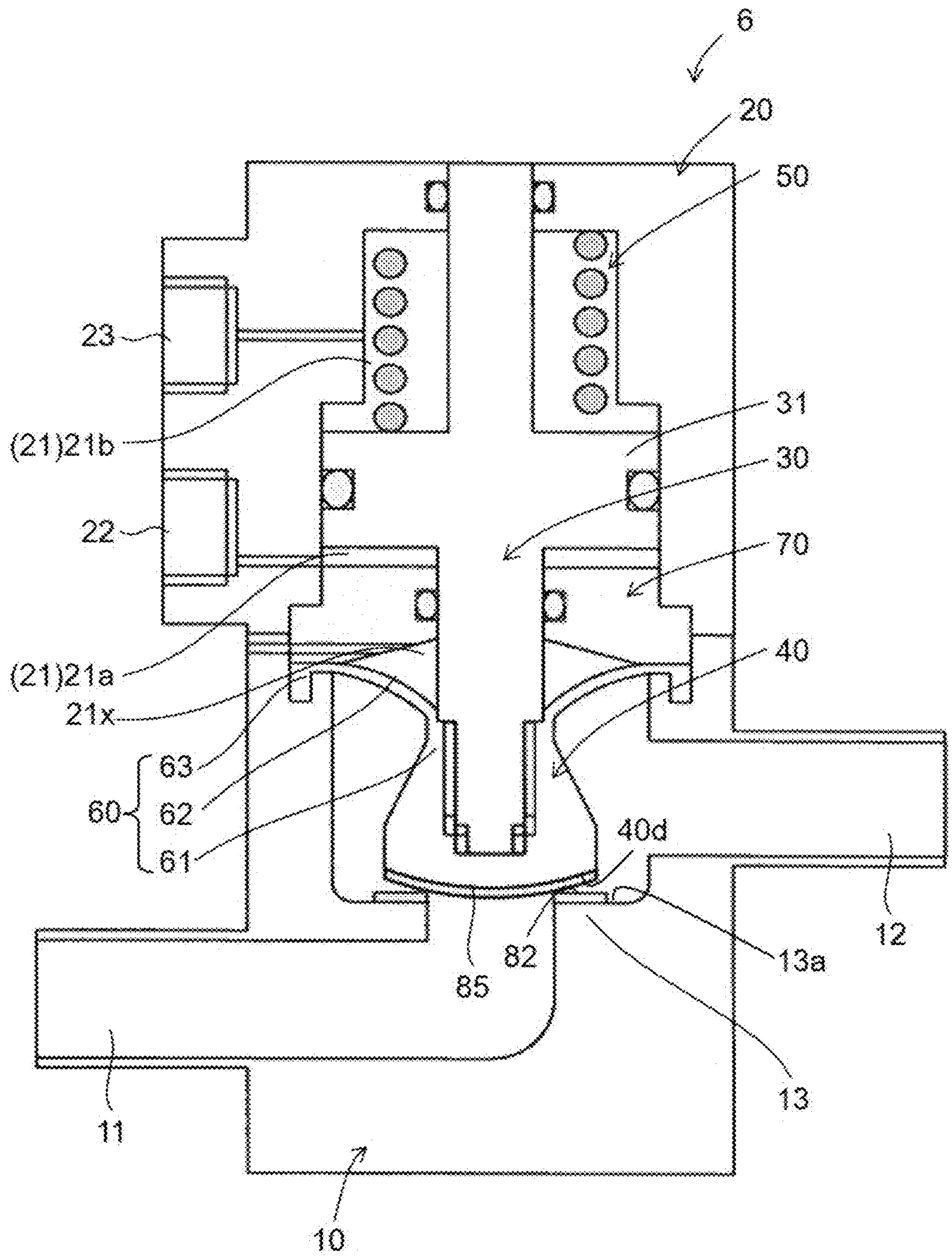

[Figs. 9]
(a)
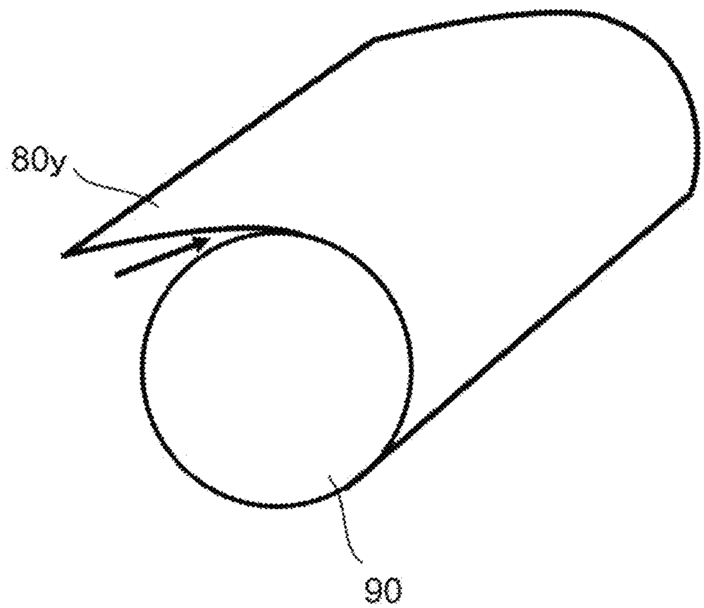
(b)
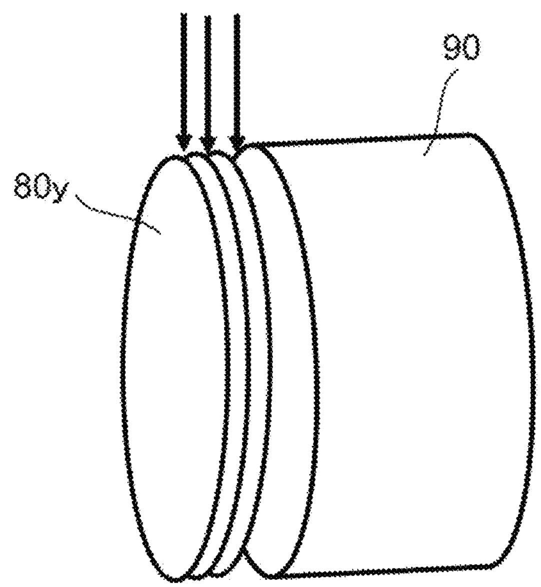

[Figs. 10]
(a)
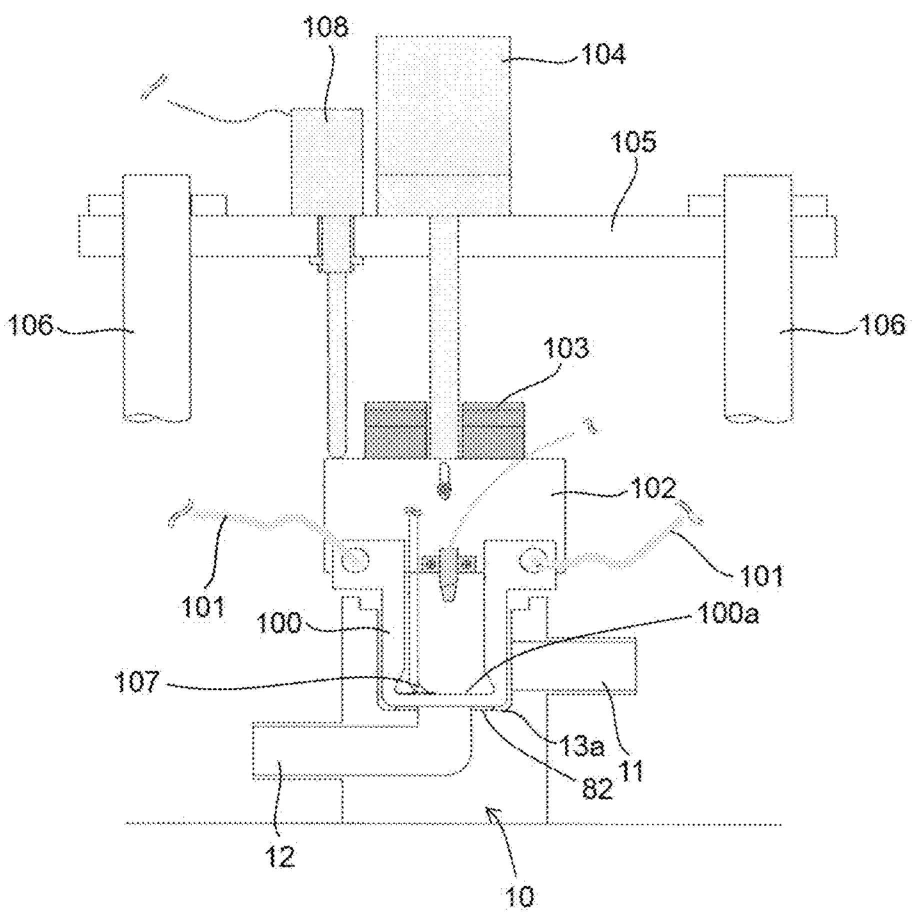
(b)
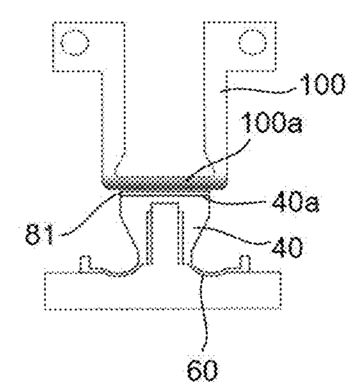

[Figs. 11]
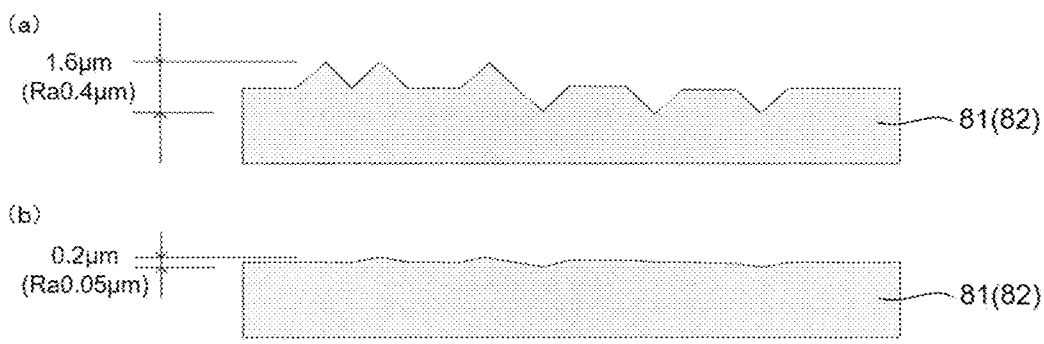

[Fig. 12]
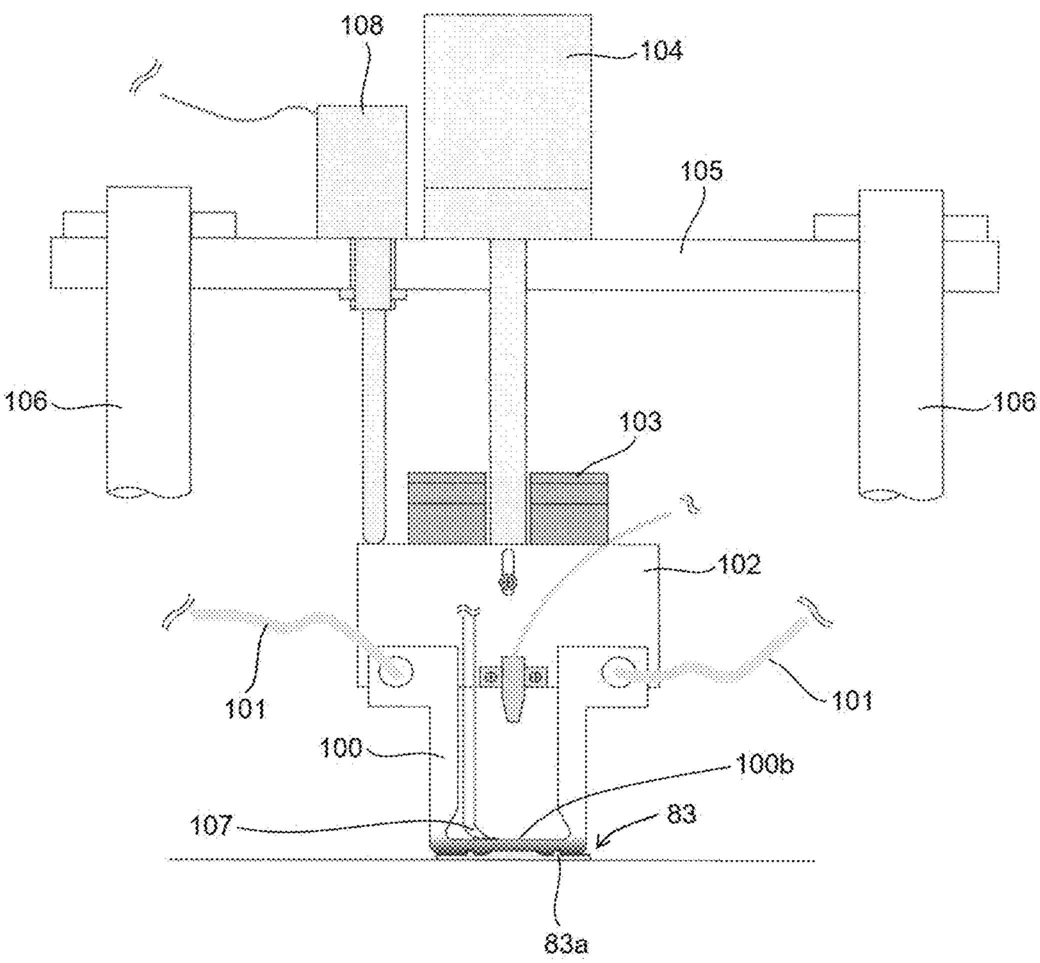

[Fig. 13]
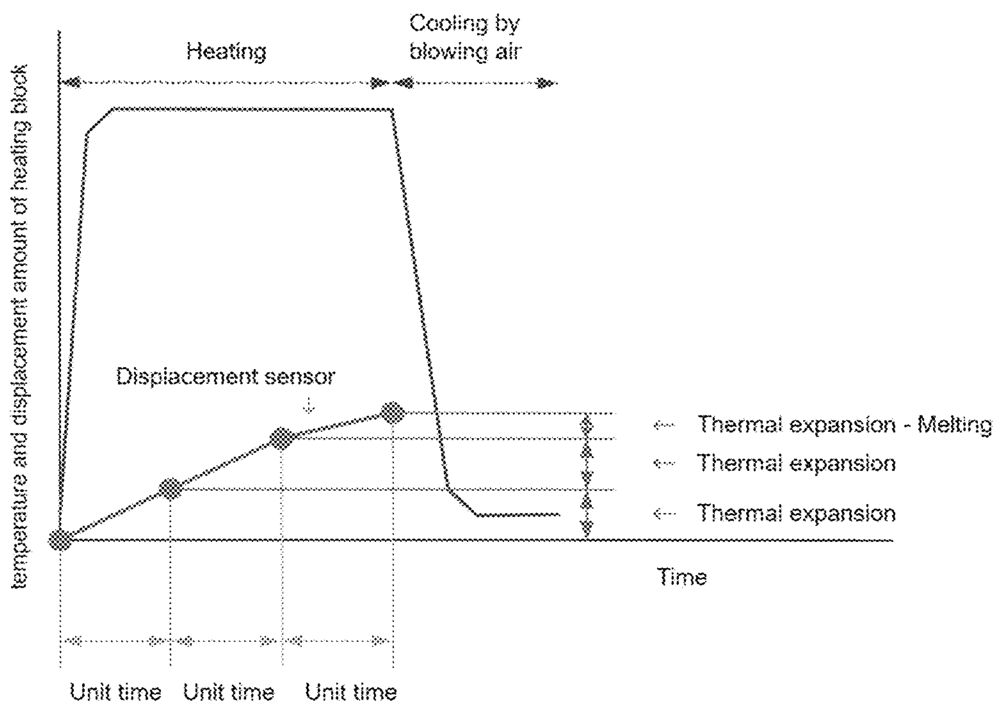

[Fig. 14]
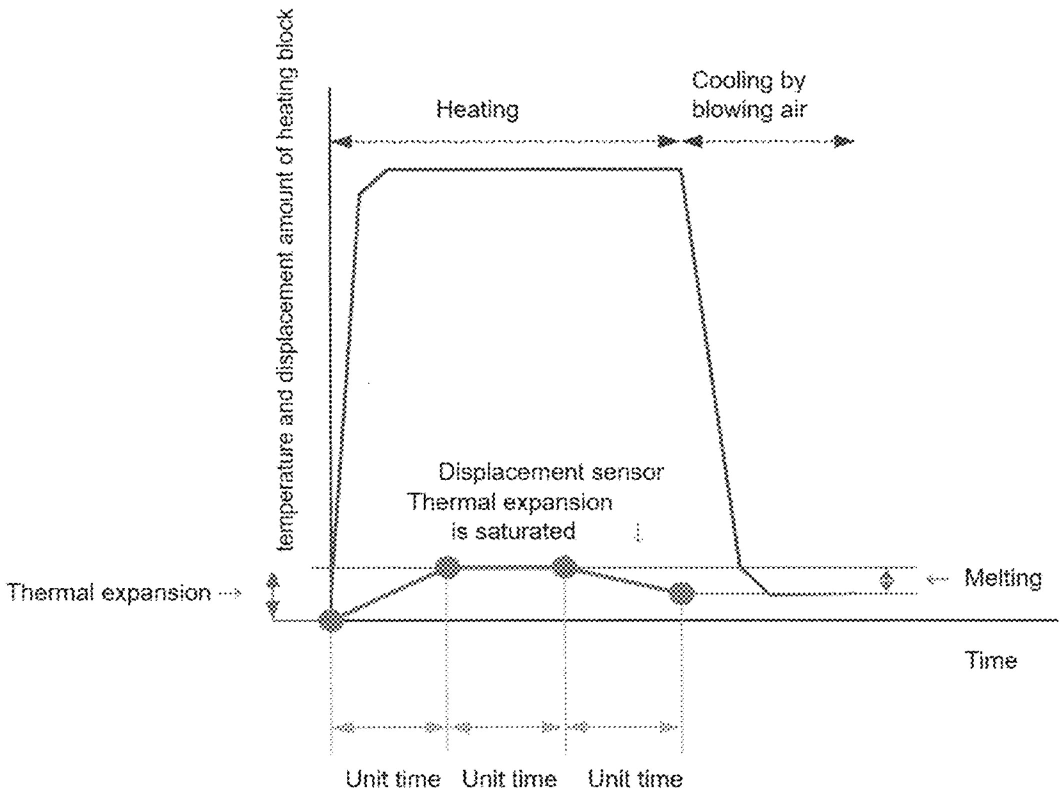

FLOW RATE CONTROL VALVE AND PRODUCING METHOD OF FLOW RATE CONTROL VALVE

TECHNICAL FIELD

The present invention relates to a flow rate control valve and a producing method of the flow rate control valve used in a washing process and a peeling-off process in a silicon wafer process in which medicinal solution of high corrosive characteristics especially such as strong acid and strong alkali is frequently used.

BACKGROUND TECHNIQUE

There exists cross-linked PTFE as material having corrosion resistance and cleanness equivalent of PTFE and PFA and having excellent abrasion resistance.

According to the cross-linked PTFE, carbon atom of carbon C-fluorine F combination which is cut by radiation irradiation is combined with other molecule generated in the same manner and is carbon C-combined. Therefore, the cross-linked PTFE has characteristics that abrasion resistance is excellent but flex resistance is low.

The abrasion resistance has an effect to reduce the dust-generating amount from a valve seat of a valve and a seal portion of a valve body. If the flex resistance is low, dust is generated from a diaphragm of a control valve.

Generally, it is required that the control valve is downsized and pressure loss thereof is low due to productivity of production of semiconductor.

This increases deformation of the diaphragm of the control valve, and if the flex resistance of material is low, crack is generated by operation of the valve, and dust is generated by the crack.

Naturally, if the crack is generated, this becomes a factor of fracture of the diaphragm. Since lifetime of a manufactured product is also shortened, the cross-linked PTFE is not employed as a poppet diaphragm of the control valve which is required to be downsized and whose pressure loss is required to be reduced.

Concerning a valve seat and a body of the valve, since liquidity is lowered by the cross-link, a seat material of 300 $mm^2$ for example cannot be produced.

Although a round bar can be produced by ram extrusion, size thereof is limited, necessary size cannot be obtained and thus, the round bar is not employed.

Even if the cross-linked PTFE is employed as one of the valve body and the valve seat, since the cross-linked PTFE prunes mating PTFE or PFA, there is no effect to reduce the dust-generating amount.

Patent document 1 discloses a technique capable of integrally forming the cross-linked PTFE and PFA.

Patent document 2 describes that it is required to eliminate a gap between members and to prevent liquid from staying.

PRIOR ART DOCUMENTS

Patent Documents

[Patent Document 1]
PCT International publication No. 2017/221877
[Patent Document 2]
Japanese Patent Application Laid-open No. 2020-200840

SUMMARY OF THE INVENTION

Problem to be Solved By the Invention

However, according to insert molding described in patent document 1, since a part is not melted and joined completely, surface-activating agent used in a part-washing process of manufacture of a liquid control valve interpenetrates in a gap between parts, and organic substance included in the surface-activating agent dissolves out when semiconductors are produced and used in some cases. In recent years, contamination of organic substance caused by miniaturization is considered problematic.

Hence, it is an object of the present invention to provide a flow rate control valve and a producing method of the flow rate control valve using cross-linked PTFE capable of reducing a dust-generating amount having excellent abrasion resistance only on a contact portion between a valve body and a valve seat.

Means for Solving the Problem

A flow rate control valve of the present invention described in claim 1 including a flow path-side body 10 and a driving-side body 20, in which an inflow flow path 11 into which to-be controlled fluid flows, an outflow flow path 12 from which the to-be controlled fluid flows out, and a valve seat 13 located between the inflow flow path 11 and the outflow flow path 12 are formed in the flow path-side body 10, a piston cylindrical space 21 in which a piston 30 is placed is formed in the driving-side body 20, a valve body 40 is placed on one end of the piston 30, an opening 21*x* is formed in one end of the piston cylindrical space 21 at a position opposed to the valve seat 13, a diaphragm 60 is placed in the opening 21*x*, the piston cylindrical space 21 and the valve seat 13 are partitioned from each other by the diaphragm 60, and the valve body 40 is placed in the diaphragm 60 at a position closer to the valve seat 13, wherein the flow path-side body 10 and the valve body 40 are formed from fluorine-based resin made of PFA or PTFE, and annular or circular seal members 81, 82, 83, 84, 85 made of cross-linked PTFE are joined to a valve body-side abutting portion 40*a*, 40*b*, 40*c*, 40*d* having the valve seat 13 against which the valve body 40 abuts and to a valve seat-side abutting portion 13*a* of the valve seat 13 against which the valve body 40 abuts.

According to the invention described in claim 2, in the flow rate control valve of claim 1, the seal member 81, 82, 83, 84, 85 is composed by laminating a cross-linked PTFE sheet 80*y* on one surface of a PFA film 80*x*, and the PFA film 80*x* is joined to the valve body-side abutting portion 40*a*, 40*b*, 40*c*, 40*d* or the valve seat-side abutting portion 13*a*.

According to the invention described in claim 3, in the flow rate control valve of claim 2, an annular projection 83*a* is formed on the seal member 81, 83 which is joined to any one of the valve body-side abutting portion 40*a*, 40*b* and the valve seat-side abutting portion 13*a*, the annular projection 83*a* is formed by changing a thickness of the PFA film 80*x*, and a thickness of the cross-linked PTFE sheet 80*y* is made uniform.

According to the invention described in claim 4, in the flow rate control valve of any one of claims 1 to 3, the valve body-side abutting portion 40*c* is formed from an annular surface which is inclined in a radial direction, and an inner periphery of the annular surface is located closer to the valve seat 13 than an outer periphery of the annular surface.

According to the invention described in claim 5, in the flow rate control valve of any one of claims 1 to 3, the valve body-side abutting portion 40*d* is formed from a convex curved surface, and a center of the convex curved surface is located closer to the valve seat 13 than an outer periphery of the convex curved surface.

According to the invention described in claim 6, in a producing method of the flow rate control valve of any one of claims 1 to 5, in a joining process in which the seal member 81, 82, 83, 84, 85 is joined to the valve body-side abutting portion 40*a*, 40*b*, 40*c*, 40*d* and to the valve seat-side abutting portion 13*a*, the seal member 81, 82, 83, 84, 85 is placed on the valve body-side abutting portion 40*a*, 40*b*, 40*c*, 40*d* or the valve seat-side abutting portion 13*a*, and a heating block 100 which is directly heated by resistive heating is pressed from the seal member 81, 82, 83, 84, 85.

According to the invention described in claim 7, in a producing method of the flow rate control valve of claim 2 or 3, a seal member forming process for forming the seal member 81, 82, 83, 84, 85 includes a diffusing and joining process in which the PFA film 80*x* and the cross-linked PTFE sheet 80*y* are laminated on each other and diffused and joined to each other, and a die-cutting process in which a laminated sheet composed of the PFA film 80*x* and the cross-linked PTFE sheet 80*y* which are diffused and joined in the diffusing and joining process is die-cut into an annular or circular shape.

According to the invention described in claim 8, in the producing method of the flow rate control valve described in claim 3, a seal member forming process for forming the seal member 83 includes a diffusing and joining process in which the PFA film 80*x* and the cross-linked PTFE sheet 80*y* are laminated on each other and diffused and joined to each other, a forming process for heating and forming a laminated sheet composed of the PFA film 80*x* and the cross-linked PTFE sheet 80*y* which are diffused and joined in the diffusing and joining process and forming the annular projection 83*a*, and a die-cutting process in which the laminated sheet formed in the forming process is die-cut into an annular or circular shape.

According to the invention described in claim 9, in the producing method of the flow rate control valve described in claim 7 or 8, the cross-linked PTFE sheet 80*y* is formed by two-dimensionally cutting an outer peripheral surface of a circular columnar or circular cylindrical rod material 90.

According to the invention described in claim 10, in the producing method of the flow rate control valve described in claim 7 or 8, the cross-linked PTFE sheet 80*y* is formed by two-dimensionally cutting an end surface of a rod material 90.

According to the invention described in claim 11, in the flow rate control valve described in claim 1, the seal member 81, 82, 83, 84, 85 which is joined to any one of the valve body-side abutting portion 40*a*, 40*b*, 40*c*, 40*d* and the valve seat-side abutting portion 13*a* is made of cross-linked PFA instead of the cross-linked PTFE.

According to the invention described in claim 12, in the producing method of the flow rate control valve described in claim 6, in the joining process, a surface of the seal member 81, 82, 83, 84, 85 is flattened by the heating block 100.

According to the invention described in claim 13, in the producing method of the flow rate control valve described in claim 6, in the joining process, heating operation is stopped when a displacement amount of the heating block 100 per unit times becomes small.

According to the invention described in claim 14, in the producing method of the flow rate control valve described in claim 6, in the joining process, heating operation is stopped when a displacement amount of the heating block 100 per unit times becomes minus.

Effect of the Invention

According to a flow rate control valve of the present invention, an annular or circular seal member made of cross-linked PTFE is joined to a valve body-side abutting portion having a valve seat against which a valve body abuts and to a valve seat-side abutting portion of the valve seat against which the valve body abuts. With this, the cross-linked PTFE having excellent abrasion resistance and capable of reducing the dust-generating amount can be used only on a contact portion between the valve body and the valve seat. Fluorine-based resin made of PFA or PTFE is used on the valve body and the valve seat and according to this, it is possible to obtain joining strength which exceeds strength of friction joining caused by high molecule entangling.

BRIEF DESCRIPTION OF THE DRAWINGS

FIG. 1 is a sectional view showing a flow rate control valve according to a first embodiment of the present invention;

FIG. 2 is a sectional view showing a flow rate control valve according to a second embodiment of the invention;

FIG. 3 are end views showing a configuration of a circular seal member which is suitable for the flow rate control valve of the first embodiment of the invention, and showing a producing process of the seal member;

FIG. 4 is a sectional view showing a flow rate control valve according to a third embodiment of the invention;

FIG. 5 is a sectional view showing a flow rate control valve according to a fourth embodiment of the invention;

FIG. 6 are end views showing a configuration of an annular seal member which is suitable for the flow rate control valves of the third and fourth embodiments of the invention, and showing a producing method of the seal member;

FIG. 7 is a sectional view showing a flow rate control valve according to a fifth embodiment of the invention;

FIG. 8 is a sectional view showing a flow rate control valve according to a sixth embodiment of the invention;

FIG. 9 are image diagrams showing a forming method of a cross-linked PTFE sheet shown in FIGS. 2 and 6;

FIG. 10 are configuration diagrams showing a device used in a joining process for joining a seal member to a valve body-side abutting portion and a valve seat-side abutting portion in the producing method of the flow rate control valve of the invention;

FIG. 11 are image diagrams of surface roughness of the seal member before and after the joining process shown in FIG. 10;

FIG. 12 is a configuration diagram showing a forming process carried out by melting shown in FIG. 6(*b*);

FIG. 13 is a graph showing heating completion timing in the joining process shown in FIG. 10(*a*); and FIG. 14 is a graph showing heating completion timing in the joining process shown in FIG. 10(*b*).

MODE FOR CARRYING OUT THE INVENTION

According to the flow rate control valve of the first embodiment of the invention, the flow path-side body and the valve body are formed from fluorine-based resin made of PFA or PTFE, and annular or circular seal members made of cross-linked PTFE are joined to a valve body-side abutting portion having the valve seat against which the valve body abuts and to a valve seat-side abutting portion of the valve seat against which the valve body abuts.

According to this embodiment, the annular or circular seal member is joined to the valve body-side abutting portion having the valve seat against which the valve body abuts and to the valve seat-side abutting portion of the valve seat against which the valve body abuts. According to this, the cross-linked PTFE having excellent abrasion resistance and capable of reducing the dust-generating amount can be used only on the contact portion between the valve body and the valve seat. Fluorine-based resin made of PFA or PTFE is used on the valve body and the valve seat and according to this, it is possible to obtain joining strength which exceeds strength of friction joining caused by high molecule entangling.

According to the second embodiment of the invention, in the flow rate control valve of the first embodiment, the seal member is composed by laminating a cross-linked PTFE sheet on one surface of a PFA film, and the PFA film is joined to the valve body-side abutting portion or the valve seat-side abutting portion.

With this embodiment, the seal member formed into the thin sheet shape by the PFA film and the cross-linked PTFE sheet. According to this, melt flow rate is less prone to be varied, welding and joining operations can be carried out while maintaining the shape, and uniform joining strength can be obtained.

According to the third embodiment of the invention, in the flow rate control valve of the second embodiment, an annular projection is formed on the seal member which is joined to any one of the valve body-side abutting portion and the valve seat-side abutting portion, the annular projection is formed by changing a thickness of the PFA film, and a thickness of the cross-linked PTFE sheet is made uniform.

With this embodiment, by forming the annular projection on the seal member, a contact area between the valve body and the valve seat can be made small. Therefore, the dust-generating amount can be reduced, the cross-linked PTFE which is difficult to be shaped can be made as a sheet having constant thickness, the annular projection is formed by changing the thickness of the PFA film and according to this, the annular projection can easily be formed.

According to the fourth embodiment of the invention, in the flow rate control valve of any one of the first to third embodiments, the valve body-side abutting portion is formed from an annular surface which is inclined in a radial direction, and an inner periphery of the annular surface is located closer to the valve seat than an outer periphery of the annular surface.

With this embodiment, by forming the valve body-side abutting portion from the annular surface, the contact area between the valve body and the valve seat can be made small and thus, the dust-generating amount can be reduced.

According to the fifth embodiment of the invention, in the flow rate control valve of any one of the first to third embodiments, the valve body-side abutting portion is formed from a convex curved surface, and a enter of the convex curved surface is located closer to the valve seat than an outer periphery of the convex curved surface.

With this embodiment, by forming the valve body-side abutting portion from the convex curved surface, the contact area between the valve body and the valve seat can be made small and thus, the dust-generating amount can be reduced.

According to the sixth embodiment of the invention, in the producing method of the flow rate control valve of any one of the first to fifth embodiments, in a joining process in which the seal member is joined to the valve body-side abutting portion and to the valve seat-side abutting portion, the seal member is placed on the valve body-side abutting portion or the value seat-side abutting portion, and a heating block which is directly heated by resistive heating is pressed from the seal member.

With this embodiment, the heating operation is carried out from the seal member side which is made of cross-linked PTFE by the heating block. According to this, the cross-linked PTFE is softened or semi-melted, and a contact interface of the valve body-side abutting portion or the valve seat-side abutting portion made of PFA or PTFE with respect to the seal member is heated and melted by heating from the seal member. Therefore, strong joining operation can be carried out. Further, the cross-linked PTFE is made as the seal member, and the heating block is directly heated by resistive heating. According to this, temperature at the contact interface can easily be controlled, and it is possible to realize the temperature control having high melting surface temperature response.

According to the seventh embodiment of the invention, in the producing method of the flow rate control valve of the second or third embodiment, a seal member forming process for forming the seal member includes a diffusing and joining process in which the PFA film and the cross-linked PTFE sheet are laminated on each other and diffused and joined to each other, and a die-cutting process in which a laminated sheet composed of the PFA film and the cross-linked PTFE sheet which are diffused and joined in the diffusing and joining process is die-cut into an annular or circular shape.

With this embodiment, the seal member can be formed using cross-linked PTFE which is difficult to be shaped.

According to the eighth embodiment of the invention, in the producing method of the flow rate control valve of the third embodiment, a seal member forming process for forming the seal member includes a diffusing and joining process in which the PFA film and the cross-linked PTFE sheet are laminated on each other and diffused and joined to each other, a forming process for heating and forming a laminated sheet composed of the PFA film and the cross-linked PTFE sheet which are diffused and joined in the diffusing and joining process and forming the annular projection, and a die-cutting process in which the laminated sheet formed in the forming process is die-cut into an annular or circular shape.

With this embodiment, the annular projection can be formed on the seal member using cross-linked PTFE which is difficult to be shaped.

According to the ninth embodiment of the invention, in the producing method of the flow rate control valve of the seventh or eighth embodiment, the cross-linked PTFE sheet is formed by two-dimensionally cutting an outer peripheral surface of a circular columnar or circular cylindrical rod material.

With this embodiment, a long cross-linked PTFE sheet having a predetermined width can be formed by two-dimensionally cutting the outer peripheral surface of the columnar or cylindrical rod material.

According to the tenth embodiment of the invention, in the producing method of the flow rate control valve of the seventh or eighth embodiment, the cross-linked PTFE sheet is formed by two-dimensionally cutting an end surface of a rod material.

With this embodiment, a cross-linked PTFE sheet having a size of the end surface can be formed by two-dimensionally cutting the end surface of the rod material.

According to the eleventh embodiment of the invention, in the flow rate control valve of the first embodiment, the seal member which is joined to any one of the valve body-side abutting portion and the valve seat-side abutting portion is made of cross-linked PFA instead of the cross-linked PTFE.

With this embodiment, an annular or circular seal member is joined to the valve body-side abutting portion having the valve seat against which the valve body abuts and to the valve seat-side abutting portion of the valve seat against which the valve body abuts. According to this, the cross-linked PFA having excellent abrasion resistance and capable of reducing the dust-generating amount can be used only on a contact portion between the valve body and the valve seat. Fluorine-based resin made of PFA or PTFE is used on the valve body and the valve seat and according to this, it is possible to obtain joining strength which exceeds strength of friction joining caused by high molecule entangling.

According to the twelfth embodiment of the invention, in the producing method of the flow rate control valve of the sixth embodiment, in the joining process, a surface of the seal member is flattened by the heating block.

With this embodiment, the heating block which is directly heated by resistive heating is pressed from the seal member. According to this, the surface of the seal member can be planarized.

According to the thirteenth embodiment of the invention, in the producing method of the flow rate control valve of the sixth embodiment, in the joining process, heating operation is stopped when a displacement amount of the heating block per unit times becomes small.

With this embodiment, the valve body or the valve seat is thermally expanded and the seal member is melted and according to this, the height of the seal member is varied. Therefore, heating completion timing of the heating block can be determined from a variation amount per unit time of the heating block. If a volume of the valve body or the valve seat is large, the thermal expansion is continued even after the welding of the seal member is completed. Therefore, if the heating operation is stopped when the variation amount per unit time of the heating block becomes small, a joined state between the seal member, the valve body-side abutting portion or the valve seat-side abutting portion can be controlled constantly.

According to the fourteenth embodiment of the invention, in the producing method of the flow rate control valve of the sixth embodiment, in the joining process, heating operation is stopped when a displacement amount of the heating block per unit times becomes minus.

With this embodiment, the valve body or the valve seat is thermally expanded and the seal member is melted and according to this, the height of the seal member is varied. Therefore, heating completion timing of the heating block can be determined from a variation amount per unit time of the heating block. If a volume of the valve body or the valve seat is small, the valve body-side abutting portion or the valve seat-side abutting portion is thermally expanded, and after the heating block moves upward, the thermal expansion is saturated and the heating block moves downward by melting of the seal member. Therefore, if the heating operation is stopped when the variation amount per unit time of the heating block becomes minus, the joined state between the seal member, the valve body-side abutting portion or the valve seat-side abutting portion can be controlled constantly.

Embodiments

Flow rate control valves according to embodiments of the present invention will be described below.

FIG. 1 is a sectional view showing the flow rate control valve of the first embodiment of the invention.

A flow rate control valve 1 according to the embodiment includes a flow path-side body 10 and a driving-side body 20.

An inflow flow path 11 into which fluid to be controlled (to-be controlled fluid, hereinafter) flows, an outflow flow path 12 from which to-be controlled fluid flows out, and a valve seat 13 located between the inflow flow path 11 and the outflow flow path 12 are formed in a flow path-side body 10.

A piston cylindrical space 21 in which a piston 30 is placed is formed in the driving-side body 20.

A valve body 40 is placed in one end of the piston 30. An end of the valve body 40 located closer to the valve seat 13 is a valve body-side abutting portion **40*a* which abuts against the valve seat 13**.

An end of the valve seat 13 located closer to the valve body 40 is a valve seat-side abutting portion **13*a* against which the valve body 40** abuts.

In this embodiment, the valve body-side abutting portion **40*a* is formed from a circular flat surface, and the valve seat-side abutting portion 13*a*** is formed from an annular flat surface.

The piston cylindrical space 21 includes piston biasing means 50 which biases the piston 30. The piston biasing means 50 biases the piston 30 in a direction in which the valve body 40 abuts against the valve seat 13.

The piston enlarged portion 31 is formed in the piston 30. The piston biasing means 50 presses the piston enlarged portion 31, thereby biasing the piston 30. A coil spring can be used as the piston biasing means 50 for example.

An opening **21*x* is formed in one end of the piston cylindrical space 21 at a position opposed to the valve seat 13**.

A diaphragm 60 is placed in the opening **21*x*, and the piston cylindrical space 21 and the valve seat 13 are partitioned from each other by the diaphragm 60. The diaphragm 60 is held by the flow path-side body 10 and a diaphragm-holder 70. The diaphragm 60 may not be provided with the diaphragm-holder 70, and may be held by the flow path-side body 10 and the driving-side body 20. Although the diaphragm-holder 70 supports the piston 30 in this embodiment, the diaphragm-holder 70 may not support the piston 30**.

The diaphragm 60 is placed on the side of the one end of the piston 30. The one end of the piston 30 is located at a center of the diaphragm 60, and the valve body 40 is placed in the diaphragm 60 on the side of the valve seat 13.

The diaphragm 60 is deformed as the piston 30 moves.

The diaphragm 60 includes a thick portion 61 connected the piston 30, a membrane portion 62 formed on an outer periphery of the thick portion 61, and a fixed portion 63 formed on an outer periphery of the membrane portion 62. The diaphragm 60 is connected to the piston 30 at a central portion of the thick portion 61, and the membrane portion 62 is mainly deformed.

Although the valve body 40 and the diaphragm 60 are integrally formed of the same material in the embodiment, the valve body 40 and the diaphragm 60 may be formed of different members.

In the flow rate control valve 1 of the embodiment, the flow path-side body 10 and the valve body 40 are made of fluorine-based resin composed of PFA (ethylene tetrafluoride perfluoroalkoxyethylene copolymer resin) or PTFE (polytetrafluoroethylene resin).

Annular or circular seal members 81 and 82 made of cross-linked PTFE are joined to the valve body-side abutting portion 40*a* and the valve seat-side abutting portion 13*a*.

In this embodiment, the circular seal member 81 is joined the valve body-side abutting portion 40*a* and the annular seal member 82 is joined to the valve seat-side abutting portion 13*a*, but the seal member 81 joined to the valve body-side abutting portion 40*a* may be an annular seal member 82.

Air flowing passages 22 and 23 are formed in the driving-side body 20. The air flowing passage 22 is in communication with a piston cylindrical space 21*a* located between the diaphragm 60 and the piston enlarged portion 31, and the air flowing passage 23 is in communication with the piston cylindrical space 21*b* where the piston biasing means 50 is placed.

FIG. 1 shows a fully-opened state of the valve body 40.

Gas is supplied from the air flowing passage 22 to the piston cylindrical space 21*a*, thereby applying pressure to the piston 30 in a direction opposed to biasing motion of the piston biasing means 50. Therefore, the piston 30 moves in a direction in which the valve body 40 separates from the valve seat 13.

The valve body 40 separates from the valve seat 13. According to this, to-be controlled fluid flows in from the inflow flow path 11, and pressure the to-be controlled fluid is applied to the diaphragm 60. Gas in the piston cylindrical space 21*b* is discharged from the air flowing passage 23.

To bring the valve body 40 from the fully-opened state to a closed state, gas existing in the piston cylindrical space 21*a* is discharged from the air flowing passage 22. By discharging gas from the piston cylindrical space 21*a*, pressure in the piston cylindrical space 21*a* is lowered, and the piston 30 moves in a direction approaching the valve seat 13 by biasing motion of the piston biasing means 50. Gas is supplied from the air flowing passage 23 into the piston cylindrical space 21*b*.

When the valve body 40 is in the closed state, the valve body 40 abuts against the valve seat 13 by the biasing motion of the piston biasing means 50, but the seal member 81 of the valve body-side abutting portion 40*a* and the seal member 82 of the valve seat-side abutting portion 13*a* abut against each other.

According to this embodiment, the annular or circular seal members 81 and 82 made of cross-linked. PTFE are joined to the valve body-side abutting portion 40*a* having the valve seat 13 against which the valve body 40 abuts and to the valve seat-side abutting portion 13*a* of the valve seat 13 against which the valve body 40 abuts. With this, the cross-linked PTFE having excellent abrasion resistance and capable of reducing the dust-generating amount can be used only on the contact portion between the valve body 40 and the valve seat 13. Fluorine-based resin made of PFA or PTFE is used on the valve body 40 and the valve seat 13 and according to this, it is possible to obtain joining strength which exceeds strength of friction joining caused by high molecule entangling.

FIG. 2 is a sectional view showing a flow rate control valve according to a second embodiment of the invention. The same symbols are allocated to the same constituent members as those of the flow rate control valve of the first embodiment and description thereof will be omitted.

In the flow rate control valve 2 of the embodiment, a projection 41 projecting toward a valve seat 13 is formed on a central portion of an end of the valve body 40 closer to the valve seat 13, and a valve body-side abutting portion 40*b* which abuts against the valve seat 13 is formed on an outer periphery of the projection 41. Therefore, the valve body-side abutting portion 40*b* is formed from an annular flat surface.

In this embodiment, an annular seal member 82 is joined to the valve body-side abutting portion 40*b*.

According to this embodiment, the annular seal member 82 made of cross-linked PTFE is joined to the valve body-side abutting portion 40*b* having a valve seat 13 against which the valve body 40 abuts and to a valve seat-side abutting portion 13*a* of the valve seat 13 against which the valve body 40 abuts. With this, the cross-linked PTFE having excellent abrasion resistance and capable of reducing the dust-generating amount can be used only on a contact portion between the valve body 40 and the valve seat 13. Fluorine-based resin made of PFA or PTFE is used on the valve body 40 and the valve seat 13 and according to this, it is possible to obtain joining strength which exceeds strength of friction joining caused by high molecule entangling.

FIG. 3 are end views showing a configuration of a circular seal member which is suitable for the flow rate control valve of the first embodiment of the invention, and showing a producing process of the seal member, wherein FIG. 3(*a*) shows a diffusing and joining process, and FIG. 3(*b*) shows a die-cutting process.

A circular seal member 81 is composed by laminating a cross-linked PTFE sheet 80*y* on one surface of a PFA film 80*x*. It is preferable that a thickness of the PFA film 80*x* is 0.3 mm to 0.6 mm, and a thickness of the cross-linked PTFE sheet 80*y* is 0.05 mm to 0.6 mm.

As shown in FIG. 3(*a*), the PFA film 80*x* and the cross-linked PTFE sheet 80*y* are laminated on, diffused and joined to each other.

As shown in FIG. 3(*b*), the circular seal member 81 is formed by die-cutting.

In the case of the annular seal member 82 of the first and second embodiments, the film and the sheet are die-cut into an annular shape by the die-cutting process shown in FIG. 3(*b*).

The PFA film 80*x* is welded to the valve body-side abutting portions 40*a* and 40*b* or to the valve seat-side abutting portion 13*a*. According to this, the circular or annular seal members 81 and 82 are joined to the valve body 40 or the valve seat 13.

A seal member forming process for forming the seal members 81 and 82 includes the diffusing and joining process to laminate, diffuse and join the PFA film 80*x* and the cross-linked PTFE sheet 80*y* to each other, and the die-cutting process to die-cut the laminated sheet formed of the PFA film 80*x* and the cross-linked PTFE sheet 80*y* into an annular or circular shape. According to this, it is possible to form the seal members 81 and 82 using cross-linked PTFE which is difficult to be shaped.

The circular or annular seal members 81 and 82 are formed into thin sheet shape by the PFA film 80*x* and the cross-linked PTFE sheet 80*y*. According to this, the melt flow rate is less prone to be varied, shape thereof can be maintained, they can be welded and joined each other, and uniform joining strength can be obtained.

FIG. 4 is a sectional view showing a flow rate control valve according to a third embodiment of the invention. The same symbols are allocated to the same constituent members as those of the flow rate control valve of the first embodiment and description thereof will be omitted.

In the flow rate, control valve 3 of this embodiment, an annular projection 83*a* is formed on a seal member 83 which is joined to a valve body-side abutting portion 40*b*. The valve body-side abutting portion 40*b* is formed from an annular flat surface on an outer periphery of a projection 41. The annular seal member 83 is joined to the valve body-side abutting portion 40*b* which is formed from the annular flat surface.

According to this embodiment, the annular seal member 83 made of cross-linked PTFE is joined to the valve body-side abutting portion 40*b* having the valve seat 13 against which the valve body 40 abuts, and the annular seal member 82 made of cross-linked PTFE is joined to the valve seat-side abutting portion 13*a* of the valve seat 13 against which the valve body 40 abuts. According to this, the cross-linked PTFE having excellent abrasion resistance and capable of reducing the dust-generating amount can be used only on a contact portion between the valve body and the valve seat. Fluorine-based resin made of PFA or PTFE is used on the valve body 40 and the valve seat 13 and according to this, it is possible to obtain joining strength which exceeds strength of friction joining caused by high molecule entangling.

Further, according to this embodiment, a contact area between the valve body 40 and the valve seat 13 can be made small by forming an annular projection 83*a* on the annular seal member 83. Therefore, the dust-generating amount can be reduced.

The annular projection 83*a* can be formed on a circular seal member 81.

FIG. 5 is a sectional view showing a flow rate control valve according to a fourth embodiment of the invention. The same symbols are allocated to the same constituent members as those of the flow rate control valves of the first to third embodiments and description thereof will be omitted.

According to the flow rate control valve 4 of this embodiment, the annular projection 83*a* is formed on a seal member 83 which is joined to a valve seat-side abutting portion 13*a*.

According to this embodiment, the annular seal member 82 made of cross-linked PTFE is joined to a valve body-side abutting portion 40*b* having a valve seat 13 against which a valve body 40 abuts, and an annular seal member 83 made of cross-linked PTFE is joined to the valve seat-side abutting portion 13*a* of the valve seat 13 against which the valve body 40 abuts. According to this, the cross-linked PTFE having excellent abrasion resistance and capable of reducing the dust-generating amount can be used only on a contact portion between the valve body 40 and the valve seat 13. Fluorine-based resin made of PFA or PTFE is used on the valve body 40 and the valve seat 13 and according to this, it is possible to obtain joining strength which exceeds strength of friction joining caused by high molecule entangling.

Further, according to this embodiment, a contact area between the valve body 40 and the valve seat 13 can be made small by forming the annular projection 83*a* on the annular seal member 83. Therefore, the dust-generating amount can be reduced.

FIG. 6 are end views showing a configuration of an annular seal member which is suitable for the flow rate control valves of the third and fourth embodiments of the invention, and showing a producing process of the seal member, wherein FIG. 6(*a*) shows a diffusing and joining process, FIG. 6(*b*) shows a forming process carried out by welding, and FIG. 6(*c*) shows a die-cutting process.

An annular circular seal member 83 is composed by laminating a cross-linked PTFE sheet 80*y* on one surface of a PFA film 80*x*. It is preferable that a thickness of the PFA film 80*x* is 0.3 mm to 0.6 mm, and a thickness of the cross-linked PTFE sheet 80*y* is 0.05 mm to 0.3 mm.

As shown in FIG. 6(*a*), the PFA film 80*x* and the cross-linked PTFE sheet 80*y* are laminated on, diffused and joined to each other.

As shown in FIG. 6(*b*), the PFA film 80*x* is melted by resistive heating and is formed by heating block. By this forming operation, the annular projection 83*a* is formed while changing a thickness of the PFA film 80*x*. If heating temperature is set equal to or lower than melting temperature of cross-linked PTFE, the cross-linked PTFE sheet 80*y* is deformed along a surface of the PFA film 80*x* in a state that a thickness of the cross-linked PTFE sheet 80*y* is uniform.

Thereafter, an annular seal member 83 is formed by die-cutting as shown in FIG. 6(*c*).

In the case of the circular seal member 81 of the first embodiment, the seal member is die-cut into a circular shape by the die-cutting process shown in FIG. 3(*b*).

By welding the PFA film 80*x* to valve body-side abutting portions 40*a* and 40*b* or a valve seat-side abutting portion 13*a*, circular or annular seal members 81 and 82 are joined to a valve body 40 or a valve seat 13.

As described above, the seal member forming process for forming the seal member 83 includes a diffusing and joining process to laminate, diffuse and join the PFA film 80*x* and the cross-linked PTFE sheet 80*y* to each other, the forming process for forming the annular projection 83*a* by heating and forming the laminated sheet formed of the PFA film 80*x* and the cross-linked PTFE sheet 80*y* which are diffused and joined to each other in the diffusing and joining process, and the die-cutting process to die-cut the laminated sheet formed in the forming process into an annular or circular shape. According to this, it is possible to form the annular projection 83*a* on the seal member 83 using the cross-linked PTFE which is difficult to be shaped.

The seal member 83 is formed into the thin sheet shape by the PFA film 80*x* and the cross-linked PTFE sheet 80*y*. According to this, melt flow rate is less prone to be varied, welding and joining operations can be carried out while maintaining the shape, and uniform joining strength can be obtained.

The cross-linked PTFE which is difficult to be shaped is formed as the sheet having uniform thickness, and the annular projection 83*a* is formed by changing the thickness of the PFA film 80*x*. According to this, the annular projection 83*a* can easily be formed.

FIG. 7 is a sectional view showing a flow rate control valve according to a fifth embodiment of the invention. The same symbols are allocated to the same constituent members as those of the flow rate control valve of the fourth embodiment and description thereof will be omitted.

In the flow rate control valve 5 of this embodiment, a projection 41 projecting toward a valve seat 13 is formed on a central portion of an end of a valve body 40 located closer to the valve seat 13, and a valve body-side abutting portion 40*c* which abuts against the valve seat 13 is formed on an outer periphery of the projection 41. The valve body-side abutting portion 40*c* is formed by an annular surface which inclines in a radial direction thereof, and an inner periphery of the annular surface is located closer to the valve seat 13 than an outer periphery of the annular surface.

An annular seal member 84 is joined to the valve body-side abutting portion 40*c*. It is preferable that the annular seal member 84 is composed such that a cross-linked PTFE sheet 80*y* is laminated on one surface of a PFA film 80*x* as shown in FIG. 3, and the seal member 84 can be produced by the producing process shown in FIG. 3. The annular seal member 84 is formed into an annular surface extending along a valve body-side abutting portion 40*d*. Therefore, the seal member 84 may be formed by melting the PFA film 80*x* using a mold by resistive heating as shown in FIG. 6(*b*). According to the annular seal member 84, a thickness of the PFA film 80*x* is uniform, and the PFA film 80*x* is formed into an inclined annular surface.

According to this embodiment, the annular seal member 84 made of cross-linked PTFE is joined to the valve body-side abutting portion 40*c* having the valve seat 13 against which the valve body 40 abuts, and the annular seal member 82 made of cross-linked PTFE is joined to the valve seat-side abutting portion 13*a* of the valve seat 13 against which the valve body 40 abuts. According to this, the cross-linked PTFE having excellent abrasion resistance and capable of reducing the dust-generating amount can be used only on a contact portion between the valve body 40 and the valve seat 13. Fluorine-based resin made of PFA or PTFE is used on the valve body 40 and the valve seat 13 and according to this, it is possible to obtain joining strength which exceeds strength of friction joining caused by high molecule entangling.

Further, according to this embodiment, a contact area between the valve body 40 and the valve seat 13 can be made small by forming the valve body-side abutting portion 40*c* from the an annular surface. Therefore, the dust-generating amount can be reduced.

FIG. 8 is a sectional view showing a flow rate control valve according to a sixth embodiment of the invention. The same symbols are allocated to the same constituent members as those of the flow rate control valves of the first to fifth embodiments and description thereof will be omitted.

According to the flow rate control valve 6 of this embodiment, an end of a valve body 40 located closer to a valve seat 13 is formed from a convex curved surface, and a valve body-side abutting portion 40*d* is formed such that a center of the convex curved surface is closer to a valve seat 13 than an outer periphery of the convex curved surface.

A circular seal member 85 is joined to the valve body-side abutting portion 40*d*. It is preferable that the circular seal member 85 is composed such that a cross-linked PTFE sheet 80*y* is laminated on one surface of a PFA film 80*x* as shown in FIG. 3, and the seal member 85 can be produced by the producing procedure shown in FIG. 3. The circular seal member 85 is formed into a convex curved surface extending along the valve body-side abutting portion 40*d*. Therefore, the PFA film 80*x* may be melted by resistive heating and formed by a mold as shown in FIG. 6(*b*). According to the circular seal member 85, a thickness of the PFA film 80*x* is uniform and the PFA film 80*x* is formed into a convex curved surface.

According to this embodiment, the circular seal member 85 made of cross-linked PTFE is joined to the valve body-side abutting portion 40*d* having the valve seat 13 against which the valve body 40 abuts, and the annular seal member 82 made of cross-linked PTFE is joined to the valve seat-side abutting portion 13*a* of the valve seat 13 against which the valve body 40 abuts. The cross-linked PTFE having excellent abrasion resistance and capable of reducing the dust-generating amount can be used only on a contact portion between the valve body 40 and the valve seat 13. Fluorine-based resin made of PFA or PTFE is used on the valve body 40 and the valve seat 13 and according to this, it is possible to obtain joining strength which exceeds strength of friction joining caused by high molecule entangling.

Further, according to this embodiment, a contact area between the valve body 40 and the valve seat 13 can be made small by forming the valve body-side abutting portion 40*d* from the convex curved surface and therefore, the dust-generating amount can be reduced.

FIG. 9 are image diagrams showing a forming method of the cross-linked PTFE sheet shown in FIGS. 2 and 6. Arrows in the drawings show a cutting direction.

As shown in FIG. 9(*a*), the cross-linked PTFE sheet 80*y* is formed by two-dimensionally cutting an outer peripheral surface of a circular columnar or circular cylindrical rod material 90.

The long cross-linked PTFE sheet 80*y* having a predetermined width can be formed by two-dimensionally cutting the outer peripheral surface of the circular columnar or circular cylindrical rod material 90 as described above.

The cross-linked PTFE sheet 80*y* is formed by two-dimensionally cutting an end surface of the rod material 90 as shown in FIG. 9(*b*).

The cross-linked PTFE sheet 80*y* having a size of the end surface can be formed by two-dimensionally cutting the end surface of the rod material 90 in this manner. When the end surface is by two-dimensionally cut, the rod material 90 is not limited to the circular columnar or circular cylindrical shape, and the rod material 90 may be formed into a columnar or cylindrical shape.

FIG. 10 are configuration diagrams showing a device used in a joining process for joining the seal member to the valve body-side abutting portion and the valve seat-side abutting portion in the producing method of the flow rate control valve of the invention.

FIG. 10(*a*) shows the joining process for joining the seal member 82 to the valve seat-side abutting portion 13*a*.

A heater cable 101 is connected to a heating block 100, electric power is supplied from the heater cable 101, and an end 100*a* of the heating block 100 is directly heated by resistive heating.

The heating block 100 is mounted on a movable block 102. A welding pressure adjusting weight 103 and a movable block lifting-up cylinder 104 are mounted on the movable block 102. The movable block lifting-up cylinder 104 is mounted on the fixing plate 105, and the fixing plate 105 is supported by a support rod 106.

The movable block 102 is pushed down by the welding pressure adjusting weight 103, and is lifted up by the movable block lifting-up cylinder 104.

The end 100*a* of the heating block 100 is provided with a temperature sensor 107 for detecting temperature of the end 100*a*. The fixing plate 105 is provided with a displacement sensor 108 for detecting displacement of the movable block 102.

In the joining process for joining the seal member 82 to the valve seat-side abutting portion 13*a*, the seal member 82 is placed on the valve seat-side abutting portion 13*a*, and the heating block 100 which is directly heated by the resistive heating is pressed from the seal member 82.

The cross-linked PTFE is directly heated by the heating block 100 from the seal member 82 which is made of cross-linked PTFE. According to this, the cross-linked PTFE is softened and semi-melted, and a contact interface of the valve seat-side abutting portion 13*a* made of PFA or PTFE with respect to the seal member 82 is heated and melted by heating from the seal member 82. Therefore, strong joining operation can be carried out. Further, the cross-linked PTFE is made as the seal member 82 and the heating block 100 is directly heated by resistive heating. According to this, temperature at the contact interface can easily be controlled, and it is possible to realize the temperature control having high melting surface temperature response.

FIG. 10(*b*) shows the joining process for joining the seal member 81 to the valve body-side abutting portion 40*a*.

In the joining process for joining the seal member 81 to the valve body-side abutting portion 40*a*, the seal member 81 is placed on the valve body-side abutting portion 40*a*, and the heating block 100 which is directly heated by the resistive heating is pressed from the seal member 81.

The cross-linked PTFE is directly heated by the heating block 100 from the seal member 81 which is made of cross-linked PTFE. According to this, the cross-linked PTFE is softened and semi-melted, and a contact interface of the valve body-side abutting portion 40*a* made of PFA or PTFE with respect to the seal member 81 is heated and melted by heating from the seal member 81. Therefore, strong joining operation can be carried out. Further, the cross-linked PTFE is made as the seal member 81 and the heating block 100 is directly heated by resistive heating. According to this, temperature at the contact interface can easily be controlled, and it is possible to realize the temperature control having high melting surface temperature response.

FIG. 11 are image diagrams of surface roughness of the seal member before and after the joining process shown in FIG. 10, wherein FIG. 11(*a*) shows the seal member before the joining process, and FIG. 11(*b*) shows the seal member after the joining process.

As shown in FIG. 11, surfaces of the seal members 81 and 82 can be flattened by pressing, from the seal members 81 and 82, the heating block 100 which is directly heated by the resistive heating. The surfaces of the seal members 81 and 82 are flattened mainly by the PFA film 80*x*.

FIG. 12 is a configuration diagram showing a forming process carried out by melting shown in FIG. 6(*b*). Configuration of a device used in the forming process shown in FIG. 12 is the same as that shown in FIG. 6(*b*), the same symbols are allocated and description thereof will be omitted.

In the device shown in FIG. 12, an annular recess is formed in an end 100*b* of the heating block 100 for forming the annular projection 83*a*.

A laminated sheet composed of the PFA film 80*x* and the cross-linked PTFE sheet 80*y* is placed on a jig, and the heating block 100 which is directly heated by the resistive heating is pressed from the cross-linked PTFE sheet 80*y*.

In this manner, the annular projection 83*a* shown in FIG. 6(*b*) can be formed.

FIG. 13 is a graph showing heating completion timing in the joining process shown in FIG. 10(*a*).

In FIG. 13, a vertical axis shows temperature of the heating block 100 detected by the temperature sensor 107 and a displacement amount of the heating block 100 detected by the displacement sensor 108, and a horizontal axis shows time.

In the joining process shown in FIG. 10(*a*), the seal member 82 is joined to the valve seat-side abutting portion 13*a*. Since the valve seat-side abutting portion 13*a* is formed on the flow path-side body 10, a volume thereof is large, and thermal expansion is continued. If the valve seat-side abutting portion 13*a* is heated, the flow path-side body 10 is thermally expanded and a position of the seal member 82 becomes high, and if the seal member 82 is melted, an upper surface of the seal member 82 becomes low.

That is, when the volume is large like the flow path-side body 10, the thermal expansion is continued also after the welding of the seal member 82 is completed, and displacement detected by the displacement sensor 108 keeps increasing, but the displacement amount per unit time detected by the displacement sensor 108 becomes small by melting of the seal member 82.

Therefore, the heating operation is stopped when the displacement amount of the heating block 100 per unit time becomes small. According to this, the joined state between the seal member 82 and the valve seat-side abutting portion 13*a* can be controlled uniformly.

The height of the seal member 82 is varied by thermally expanding the valve seat 13 and melting the seal member 82 in this manner. Therefore, the stopping timing of the heating operation of the heating block 100 can be determined from the displacement amount of the heating block 100 per unit time.

When the volume of valve body 40 is large, similarly, the joined state between the seal member 81 and the valve body-side abutting portion 40*b* can be controlled uniformly by stopping the heating operation when the displacement amount of the heating block 100 per unit time becomes small.

After the heating operation is stopped, the heating block 100 is cooled by blowing air. The heating block 100 may be cooled naturally.

FIG. 14 is a graph showing heating completion timing in the joining process shown in FIG. 10(*b*).

In FIG. 14, a vertical axis shows temperature of the heating block 100 detected by the temperature sensor 107 and a displacement amount of the heating block 100 detected by the displacement sensor 108, and a horizontal axis shows time.

In the joining process shown in FIG. 10(*b*), the seal member 81 is joined to the valve body-side abutting portion 40*b*. Since the valve body-side abutting portion 40*b* is formed on the valve body 40, the volume is small and thermal expansion is saturated.

That is, when the volume is small like the valve body 40, the valve body-side abutting portion 40*b* is heated and the valve body 40 is thermally expanded. According to this, the thermal expansion is saturated after the heating block 100 moves upward, and the heating block 100 moves downward by melting of the seal member 81.

Therefore, by stopping the heating operation when the displacement amount of the heating block 100 per unit time becomes minus, the joined state between the seal member 81 and the valve body-side abutting portion 40*b* can be controlled uniformly.

Since the height of the seal member 81 is varied by thermally expanding the valve body-side abutting portion 40*b* and melting the seal member 81 in this manner, the stopping timing of heating operation of the heating block 100 can be determined from the displacement amount of the heating block 100 per unit time.

When the volume of the valve seat 13 is small, similarly, the joined state between the seal member 82 and the valve seat-side abutting portion 13*a* can be controlled uniformly by stopping the heating operation when the displacement amount of the heating block 100 per unit time becomes minus.

After the heating operation is stopped, the heating block 100 is cooled by blowing air. The heating block 100 may be cooled naturally.

The seal member 81, 82, 83, 84 or 85 which is joined to any one of the valve body-side abutting portion 40*a*, 40*b*, 40*c*, 40*d* and the valve seat-side abutting portion 13*a* may be made of cross-linked PFA instead of cross-linked PTFE.

The annular or circular seal member 81, 82, 83, 84 or 85 made of cross-linked PFA is joined to the valve body-side abutting portion 40*a*, 40*b*, 40*c*, 40*d* having the valve seat 13 against which the valve body 40 abuts and to the valve seat-side abutting portion 13*a* of the valve seat 13 against the valve body 40 abuts. According to this, the cross-linked PFA having excellent abrasion resistance and capable of reducing the dust-generating amount can be used only on the contact portion between the valve body 40 and the valve seat 13. Fluorine-based resin made of PFA or PTFE is used on the valve body 40 and the valve seat 13 and according to this, it is possible to obtain joining strength which exceeds strength of friction joining caused by high molecule entangling.

INDUSTRIAL APPLICABILITY

The present invention is suitable for a flow rate control valve used in a washing process or a peeling-off process of a silicon wafer process especially in a semiconductor manufacture field.

EXPLANATION OF SYMBOLS

1, 2, 3, 4, 5 flow rate control valve
10 flow path-side body
11 inflow flow path
12 outflow flow path
13 valve seat
13*a* valve seat-side abutting portion
20 driving-side body
21, 21*a*, 21*b* piston cylindrical space
21*x* opening
22, 23 air flowing passage
30 piston
31 piston enlarged portion
40 valve body
40*a*, 40*b*, 40*c*, 40*d* valve body-side abutting portion
41 projection
50 piston biasing means
60 diaphragm
61 thick portion
62 membrane portion
63 fixed portion
70 diaphragm-holder
80*x* PFA film
80*y* cross-linked PTFE sheet
81, 82, 83, 84, 85 seal member
83*a* annular projection
90 rod material
100 heating block
101 heater cable
100*a*, 10*b* end
102 movable block
103 welding pressure adjusting weight
104 movable block lifting-up cylinder
105 fixing plate
106 support rod
107 temperature sensor
108 displacement sensor

The invention claimed is:

1. A flow rate control valve comprising a flow path-side body and a driving-side body, in which
   an inflow flow path into which to-be controlled fluid flows, an outflow flow path from which the to-be controlled fluid flows out, and a valve seat located between the inflow flow path and the outflow flow path are formed in the flow path-side body,
   a piston cylindrical space in which a piston is placed is formed in the driving-side body,
   a valve body is placed on one end of the piston,
   an opening is formed in one end of the piston cylindrical space at a position opposed to the valve seat,
   a diaphragm is placed in the opening,
   the piston cylindrical space and the valve seat are partitioned from each other by the diaphragm, and
   the valve body is placed in the diaphragm at a position closer to the valve seat, wherein
   the flow path-side body and the valve body are formed from fluorine-based resin made of PEA or PTFE, and
   annular or circular seal members made of cross-linked PTFE are joined to a valve body-side abutting portion having the valve seat against which the valve body abuts and to a valve seat-side abutting portion of the valve seat against which the valve body abuts,
   wherein at least one of:
   (i) the seal member is composed by laminating a cross-linked PTFE sheet on one surface of a PFA film, and
   (ii) the PFA film is joined to the valve body-side abutting portion or the valve seat-side abutting portion.

2. The flow rate control valve according to claim 1, wherein an annular projection is formed on the seal member which is joined to any one of the valve body-side abutting portion and the valve seat-side abutting portion,
   the annular projection is formed by changing a thickness of the PFA film, and
   a thickness of the cross-linked PTFE sheet is made uniform.

3. The flow rate control valve according to claim 1, wherein the valve body-side abutting portion is formed from an annular surface which is inclined in a radial direction, and an inner periphery of the annular surface is located closer to the valve seat than an outer periphery of the annular surface.

4. The flow rate control valve according to claim 1, wherein the valve body-side abutting portion is formed from a convex curved surface, and a center of the convex curved surface is located closer to the valve seat than an outer periphery of the convex curved surface.

5. A producing method of the flow rate control valve according to claim 1, wherein in a joining process in which the seal member is joined to the valve body-side abutting portion and to the valve seat-side abutting portion,
   the seal member is placed on the valve body-side abutting portion or the valve seat-side abutting portion, and
   a heating block which is directly heated by resistive heating is pressed from the seal member.

6. A producing method of the flow rate control valve according to claim 1, wherein a seal member forming process for forming the seal member includes:
   a diffusing and joining process in which the PFA film and the cross-linked PTFE sheet are laminated on each other and diffused and joined to each other, and
   a die-cutting process in which a laminated sheet composed of the PFA film and the cross-linked PTFE sheet which are diffused and joined in the diffusing and joining process is die-cut into an annular or circular shape.

7. A producing method of the flow rate control valve according to claim 2, wherein a seal member forming process for forming the seal member includes:

a diffusing and joining process in which the PFA film and the cross-linked PTFE sheet are laminated on each other and diffused and joined to each other, a forming process for heating and forming a laminated sheet composed of the PFA film and the cross-linked PTFE sheet which are diffused and joined in the diffusing and joining process and forming the annular projection, and a die-cutting process in which the laminated sheet formed in the forming process is die-cut into an annular or circular shape.

8. The producing method of the flow rate control valve according to claim 6, wherein the cross-linked PTFE sheet is formed by two-dimensionally cutting an outer peripheral surface of a circular columnar or circular cylindrical rod material.

9. The producing method of the flow rate control valve according to claim 6, wherein the cross-linked PTFE sheet is formed by two-dimensionally cutting an end surface of a rod material.

10. The flow rate control valve according to in claim 1, wherein the seal member which is joined to any one of the valve body-side abutting portion and the valve seat-side abutting portion is made of cross-linked PFA instead of the cross-linked PTFE.

11. The producing method of the flow rate control valve according to claim 5, wherein in the joining process, a surface of the seal member is flattened by the heating block.

12. The producing method of the flow rate control valve according to claim 5, wherein in the joining process, heating operation is stopped when a displacement amount of the heating block per unit times becomes small.

13. The producing method of the flow rate control valve according to claim 5, wherein in the joining process, heating operation is stopped when a displacement amount of the heating block per unit times becomes minus.

* * * * *